United States Patent
Eng

(10) Patent No.: US 6,716,307 B2
(45) Date of Patent: Apr. 6, 2004

(54) PROCESS AND SYSTEM FOR THE REMOVAL OF SCALE BUILD-UP

(75) Inventor: Goh Hock Eng, Singapore (SG)

(73) Assignee: Buckman Laboratories International, Inc., Memphis, TN (US)

( * ) Notice: Subject to any disclaimer, the term of this patent is extended or adjusted under 35 U.S.C. 154(b) by 0 days.

(21) Appl. No.: 10/123,078

(22) Filed: Apr. 15, 2002

(65) Prior Publication Data

US 2002/0179263 A1 Dec. 5, 2002

Related U.S. Application Data

(60) Provisional application No. 60/284,049, filed on Apr. 16, 2001.

(51) Int. Cl.[7] .................................................. D21C 7/14
(52) U.S. Cl. .......................... 162/48; 162/199; 162/19; 162/233; 162/275; 210/767; 210/772; 134/34; 134/22.13
(58) Field of Search ............................. 162/19, 48, 72, 162/76, 90, 272, 274, 251, 250, 199, 233, 239, 41, 86, 42, 43, 44, 275, 276, 279; 210/767, 772, 175, 194, 348, 640; 422/900; 209/172, 158, 422; 134/34, 22.13

(56) References Cited

U.S. PATENT DOCUMENTS

| | | | |
|---|---|---|---|
| 2,008,839 A | | 7/1935 | Samson ........................ 257/1 |
| 4,313,790 A | | 2/1982 | Pelton et al. ................ 162/163 |
| 4,496,426 A | * | 1/1985 | Baumeister et al. .......... 162/19 |
| 5,230,774 A | | 7/1993 | Greer et al. ............. 162/164.3 |
| 5,565,061 A | | 10/1996 | Salminen ...................... 162/48 |
| 5,874,453 A | | 2/1999 | Oppong et al. ............. 514/367 |
| 6,103,131 A | | 8/2000 | McNeel et al. ............. 210/764 |

FOREIGN PATENT DOCUMENTS

| | | | |
|---|---|---|---|
| EP | 0 335 684 | 10/1989 | ......... C07D/487/18 |
| EP | 0 358 996 | 3/1990 | .......... D21H/21/02 |
| WO | WO 96/29291 | 9/1996 | ............. C02F/5/02 |

OTHER PUBLICATIONS

International Search Report for PCT/US02/11506.

* cited by examiner

Primary Examiner—Steven P. Griffin
Assistant Examiner—Mark Halpern
(74) Attorney, Agent, or Firm—Kilyk & Bowersox P.L.L.C.

(57) ABSTRACT

A method to remove scale build-up in a vessel having at least one screen is described and involves placing a cover inside the vessel such that it is located beneath at least one screen to separate the screen from the rest of the vessel. The cover in the vessel forms an upper portion and a lower portion in the vessel. Preferably, the cover is in close proximity to the screen which is located in the upper portion of the vessel. The method then further includes introducing a chemical formulation into the upper portion of the vessel in a sufficient amount to remove at least a portion of the scale build-up on the screen. A system to remove scale build-up is also described and includes a vessel having at least one screen. The system further includes a cover located inside the vessel and beneath at least one screen to separate the screen from the rest of the vessel and to form an upper portion and a lower portion in the vessel. Normally the cover is in close proximity to the screen. The system further includes a chemical formulation present in the upper portion of the screen to remove scale build-up. The system of the present invention provide an economical and chemical means to remove scale build-up in vessels that are especially large, such as those used in the paper and pulp manufacturing industry. The present invention further reduces the time needed to remove scale build-up in vessels have one or more screens.

23 Claims, 3 Drawing Sheets

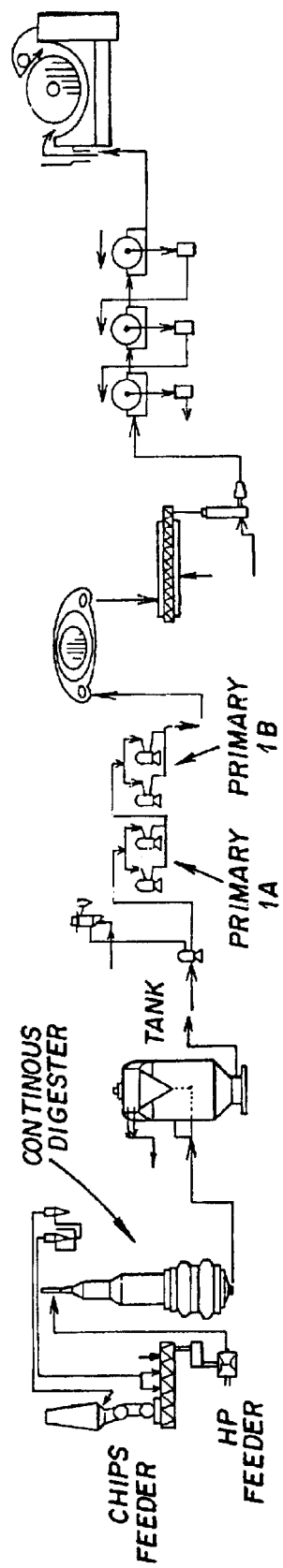

PROCESS AND SYSTEM FOR THE REMOVAL OF SCALE BUILD-UP

This application claims the benefit under 35 U.S.C. §119(e) of prior U.S. Provisional Patent Application No. 60/284,049 filed Apr. 16, 2001, which is incorporated in its entirety by reference herein.

BACKGROUND OF THE INVENTION

The present invention relates to the removal of scale build-up. More particularly, the present invention relates to the control of deposits in such systems as pulp and paper manufacturing plants.

Basically, the control of deposits is an essential part of modern pulp and paper manufacture. There is a complex interaction of fibers, water extractives, air, microorganisms, and chemical additives that produces a wide variety of deposits made worse by the mechanical processing involved in certain stages of the paper making process. These deposits cause difficulties in the operation of paper machines, cause losses in production, increase the cost of maintenance and adversely affect the product quality. Left untreated, deposit built-up in the mill can produce costly problems. The deposits can plug wires and screens, thereby interfering with the necessary free-flow of process water and chemicals.

The present invention provides a new process for the removal of the build-up of scale. These are hard deposits, usually inorganic materials, on screens, headboxes, pipes, wires, vacuum pump impellers, and etc. Scale results from the crystallization, precipitation, or coagulation of non-resinous materials. Materials involved in the formation of scale deposits can be brought in with the wood or introduced with the additives for the pulping, bleaching, and papermaking processes.

Currently, scaling, for instance in paper and pulp mills can occur in a variety of areas, such as in the bleaching stages. Scaling in such locations is an ongoing problem in the industry wherein the scaling occurs to a rapid degree on the screens used in the paper and pulp mill such as in the D1 stage. When the scale build-up reaches certain levels, the equipment must be taken off-line to do mechanical descaling because chemical boil out of the system is generally uneconomical and therefore unfeasible mainly due to the massive volume of the chemicals that would be needed for such a boil out. For instance, some tanks used in the paper and pulp mill can hold volumes such as 10,000 tons which would require enormous amounts of chemical in order to remove the scale by chemical means. When the descaling operation occurs in vessels used in such pulp mills, for instance, the mechanical or manual cleaning can take three to four weeks to clean and leads to the operation being shut down for this amount of time. Furthermore, the descaling can be required about every three months. Thus, the operating efficiency of the overall pulp mill declines significantly and further, due to the scale build-up, the quality of the pulp also degrades over time.

Accordingly, there is a desire and need in the industry to provide an alternative method and system to remove scale build-up in paper and pulp mills and other systems to avoid lengthy shut downs of the various components of the mill thus saving significant amounts of time and money and increasing the overall efficiency of the paper and pulp mill or other systems.

SUMMARY OF THE INVENTION

A feature of the present invention is to provide a system and process to remove scale build-up from a variety of systems, such as vessels used in paper and pulp mills.

Another feature of the present invention is to provide a system and method to chemically remove scale build-up in order to avoid the use of mechanical cleaning and the time delays associated with mechanical cleaning of components, for instance, used in paper and pulp mills, such as screens.

Another feature of the present invention is to provide a system and process for removing scale build-up which will avoid lengthy shut downs of paper and pulp manufacturing plants.

Additional features and advantages of the present invention will be realized and obtained by means of the elements and combinations particularly pointed out in the written description and appended claims.

To achieve these and other advantages and in accordance with the purposes of the present invention, as embodied and broadly described herein, the present invention relates to a system to remove scale build-up which includes a vessel having at least one screen and also included in the system is a cover located inside the vessel and beneath the screen to separate the screen from the rest of the vessel. The cover defines an upper portion of the vessel and a lower portion of the vessel. Furthermore, the cover is in close proximity to the screen. The system of the present invention further involves the presence of a descaler composition or boil out chemical formulation which is present in the upper portion of the vessel.

The present invention further relates to a method to remove scale build-up in a vessel having at least one screen. The method involves placing a cover inside the vessel and the cover is located beneath the screen to separate the screen from the rest of the vessel. The cover is in close proximity to the screen and defines an upper portion and a lower portion of the vessel. The method further involves introducing a descaler composition or boil out chemical formulation into the upper portion of the vessel in a sufficient amount to remove at least a portion of the scale build-up on the screen.

It is to be understood that both the foregoing general description and the following detailed description are exemplary and explanatory only, and are intended to provide a further explanation of the present invention, as claimed.

The accompanying drawings, which are incorporated in and constitute a part of this application, illustrate several embodiments of the present invention and together with the description, serve to explain the principles of the present invention.

BRIEF DESCRIPTION OF THE DRAWINGS

FIGS. 2A and 2B are schematic flow diagrams showing examples of various steps which can be used in the bleaching of pulp wherein several steps include the use of diffuser vessels as indicated by D1 and D2.

DETAILED DESCRIPTION OF THE PRESENT INVENTION

Figure 1:
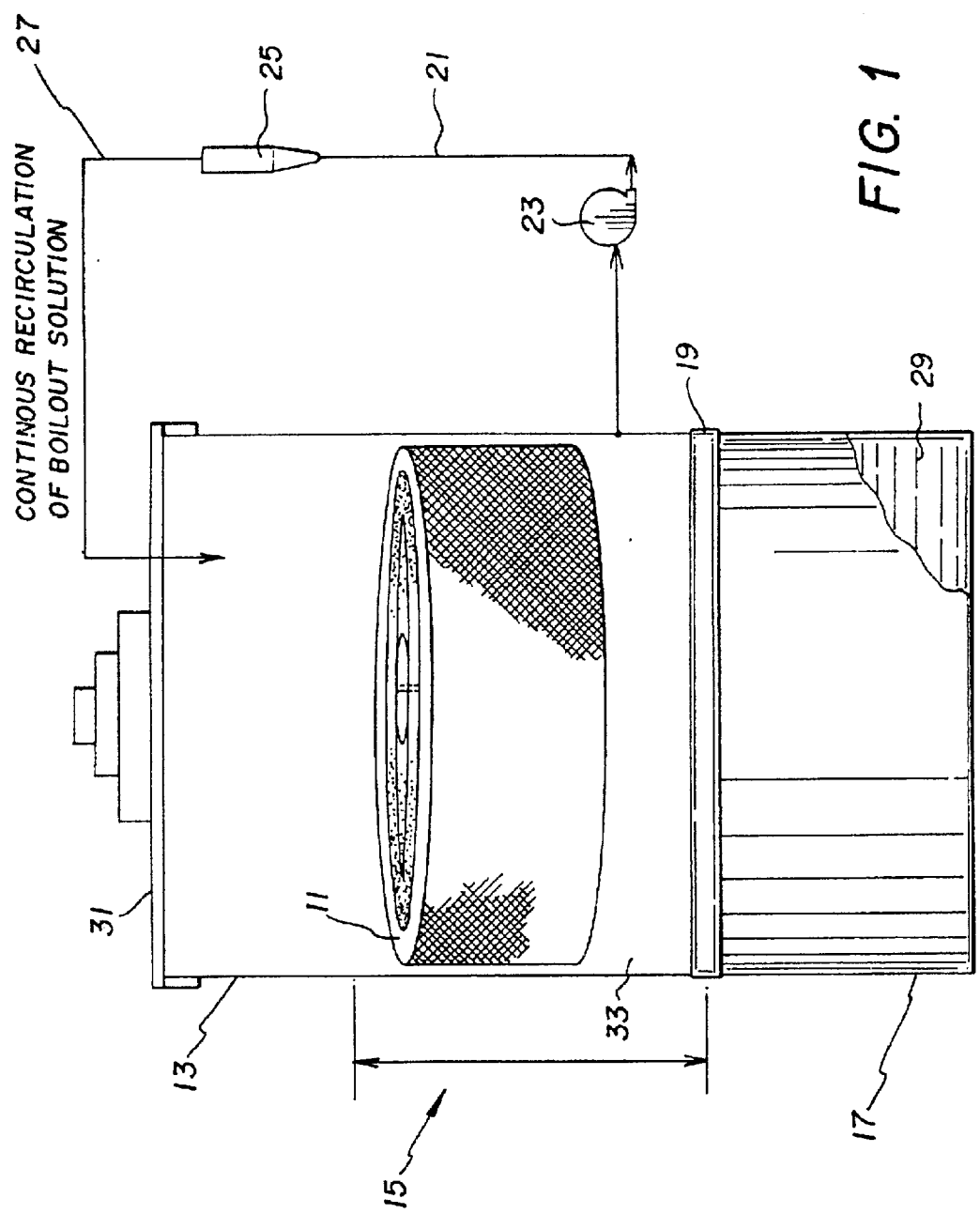
FIG. 1 is a schematic diagram showing an embodiment of the present invention wherein screens are located in diffuser, which is used for instance in the bleaching of pulp.

The present invention provides a system and a method for removing scale build-up in vessels which preferably contain one or more screens. These vessels are typically used in a variety of processes including, but not limited to, paper making processes, the processing of pulp, the bleaching of pulp, and other manufacturing processes.

As indicated in the background, prior to the present invention, these vessels, which can be considerably large, could not readily remove scale build-up using chemical means due to the large amount of chemicals that would have to be used due to the size of the vessel. Instead, mechanical means were used to remove the scale build-up which required an entire shut down of the part of the process using these vessels wherein the shut down would last several weeks to several months.

The present invention permits an economical way to remove build-up by chemical means and further provides a process to remove scale build-up that takes one or several days as opposed to weeks or months. Furthermore, the present invention provides a process and system which can substantially remove all scale build-up in the vessel and primarily on the screen(s) preferably to an extent where the bare metal is restored on the screens.

In the present invention, the method to remove scale build-up in a vessel, preferably having at least one screen and wherein the screen has scale build-up, is accomplished by placing a cover inside the vessel. The cover is located beneath the screen or screens and generally separates at least one screen from the rest of the vessel. The cover is located in close proximity to the screen and is preferably located as close as possible to the screen. The cover by its placement in the vessel separates the vessel into an upper portion and a lower portion. The screen would be located in the upper portion of the vessel. The cover separating the upper portion from the lower portion of the vessel is removable and is used as a temporary means to separate the upper portion from the lower portion. The cover preferably provides a liquid tight separation between the upper portion and the lower portion of the vessel.

Once the cover is in place, a descaler composition or boil-out chemical formulation is introduced into the upper portion of the vessel. The boil-out chemical formulation is preferably added in a sufficient amount to remove at least a portion of the scale build-up on one or more screens. Any chemical formulation capable of removing scale build-up can be used for purposes of the present invention. Preferably, the boil-out chemical formulation is added in a sufficient amount to submerge the screen in the boil-out chemical formulation. Preferably, the boil-out chemical formulation is in contact with one or more screens for a sufficient time to permit the removal of at least a portion of the scale build-up on one or more screens. More preferably, the contact time for the boil-out chemical formulation is from about several hours to several days. Even more preferably, the contact time is from about 24 hours or less to about 48 hours or more and most preferably from about 24 hours to about 36 hours. Preferably, the boil-out chemical formulation is heated during the process to accelerate the removal of scale. Any suitable temperature can be used, such as from about 55° C. or lower to about 95° C. or higher, and more preferably from about 75° C. to about 95° C. During the period of contact time at the mentioned temperature, the boil-out solution is preferably recirculated to create the turbulence needed to facilitate the removal of the scale.

After the boil-out chemical formulation has been present and recirculated for a sufficient time, the boil-out chemical formulation can then be removed by pumping out the formulation or be removed using other means known to those skilled in the art to remove chemical formulations from a vessel. The upper portion of the vessel can be washed out with water or other solution to remove any residual boil-out chemical formulation. Then, the cover can be removed. Any residual scale remaining on the screen is generally weakened and loosened by the treatment with the chemical formulation and can be removed by means of spraying the screens with jet of water at sufficient pressure to remove any residual loosened scale build-up. The follow-up cleaning can also occur in the vessel. Some scale build-up may remain on the screens, however, the scale build-up that may be present will be generally soft and easily removed by general cleaning with medium pressure water. The removal of the scale that remains after the removal of the boil-out chemical formulation is quite different from the original scaling present prior to the process of the present invention which could not be even removed by general cleaning but had to be removed by strenuous mechanical scrubbing which would take several weeks. Thus, the present invention provides a means to remove scale build-up through mechanical means as well as simple and easy mechanical means for any residual deposits that remain.

In more detail, the vessel that is used in the method of the present invention is typically any vessel that is susceptible to scale build-up and generally is a vessel(s) susceptible to scale build-up due to at least the screens being present in the vessel. As indicated, these types of vessels having one or more screens are typically used in the pulp and paper industry. These vessels can have capacities of from 1,000 tons or less to about 10,000 tons or more and preferably have a capacity of from about 2,000 tons to about 2,500 tons. The scale build-up that is present in the vessel and generally on the screens can be inorganic and/or organic. For example, the scale may contain calcium or oxides thereof or other inorganic compounds such as potassium oxides, copper oxides, aluminum oxides, magnesium oxides, manganese oxides, iron oxides, zinc oxides, sulphur or oxides thereof, phosphorus or oxides thereof, and the like. Generally, any type of inorganic and/or organic scale build-up can be removed using the methods and systems of the present invention.

The screens that are typically present in the vessel can be any screens commonly associated with, for instance, pulp or paper manufacturing and the like. These screens can be circular in nature as shown in FIG. 1 (or any other shape) or can be a series of screens placed in parallel to each other or can be one large screen placed across the diameter of the vessel. Typically, the screens are metal. The screen may be made from other materials as well.

The cover that is used temporarily in the vessel to form the upper portion and lower portion of the vessel is preferably a flexible thermoplastic material. The cover can be made from any material as long as the cover is sufficient to be liquid tight to the boil-out chemical formulation which will be located and in contact with the cover. Further, the cover is preferably resistant to the descaler or boil-out chemical formulation. An example of a suitable material for the cover is a thermal resistant fabric or tarp such as old paper machine forming wire of polyester or polyamides material.

The thickness of the cover can be any thickness capable of accomplishing the above-described goals but preferably is of a thickness of from about 0.2 mm or less to about 0.6 mm or more and more preferably from about 0.4 mm to about 0.6 mm. As indicated above, the cover is preferably placed immediately beneath the one or more screens in order to separate the screen from the rest of the lower portion of the vessel. The placement of the cover can be done by placing the cover or inserting the cover through the screens and then opening the cover to its spread-out position in order to cover the entire diameter or surface area of the vessel in order to prevent any liquid from entering the portion located beneath the cover. Alternatively, the cover can be inserted by removing the screens and then placing the screens back in their original location.

In a preferred embodiment of the present invention, the material that is generally processed through the vessel is left in the vessel at a point just beneath the screen(s) so that the cover rests on top of the material in order for the material to support the cover. In more preferred embodiments, the vessel can typically have pulp or intermediates thereof in the lower portion and typically, the pulp is permitted to be removed at a level which is located just beneath the screen. Then, the cover is placed inside the vessel underneath the screens but on top of the pulp wherein the pulp supports the cover and the cover prevents the boil-out chemicals from contacting the pulp. One advantage of the present invention is that the pulp preferably supports the cover and permits a small amount of boil-out chemical formulation needed to submerge the screen in the boil-out formulation. If the vessel was entirely empty, a large amount of boil-out chemical formulation would be needed to submerge the screens that are located at the top or upper portion of the vessel. As indicated, the primary scale build-up is present in the screens. Thus, in order to minimize the amount of boil-out chemical formulation needed and to avoid a complete emptying of the vessel, the materials that are typically in the vessel, such as pulp, are only removed to an extent that the screen is exposed and a cover can be located underneath the screens to permit the separation of the material from the boil-out chemical formulation which is subsequently introduced to remove the scale build-up. Typically, the screen is in close proximity to the cover such that the cover is only several centimeters from the screen though any distance is possible realizing that the closer the cover is to the screen, the less boil-out chemical formulation is needed in the vessel. Preferably, there should be at least a small distance between the screen and the cover in order to ensure that the boil-out chemical formulation is contacting preferably all parts of the screen. Another benefit of the cover is that the cover prevents any turbulence of the material, such as the pulp that is located underneath the cover, especially when recirculation is needed during the boil-out.

Additional components can also be used as part of the method and system of the present invention. For instance, a recirculation system can be present such that the boil-out chemical formulation is recirculated in order to ensure that fresh boil-out chemical formulation is always contacting the scale build-up on the screens. This system can easily be accomplished by having an inlet and outlet to reintroduce and remove boil-out chemical formulation. Further, fresh boil-out chemical formulation can be used to replace any amount of boil-out chemical formulation that is pumped out of the system during the optional recirculation.

The boil-out chemical formulation used to remove the scale build-up can be any chemicals typically used to remove scale build-up and are known to those skilled in the art. Thus, descaler chemicals can be used and the like. Examples of suitable boil-out chemical formulations include, but are not limited to, acids (e.g., sulfamic acid), alkalis (e.g., caustic soda), dispersing agents, chelating agents (e.g., EDTA), and the like. Combinations of such chemicals can be used, which may also contain corrosion inhibitors, penetrating agents, passivating agents, and the like. Commercially available boil-out chemical formulations that can be used can be obtained from Buckman Laboratories International, Inc., such as Busperse 2043, Busperse 2139, Busperse 46 and other Busperse products available from Buckman Laboratories International, Inc.(and from associated Buckman companies around the world). The concentration and amount of the boil-out chemical formulation can be used in conventional amounts.

The concentration of the boil-out formulation can be any suitable concentration used to remove scale build-up. Typical examples include, but are not limited to, from about 5% or less to about 10% or more by weight of Busperse 2043. The boil-out chemical formulation can further comprise at least one dispersant or other ingredients commonly associated with boil-out chemical formulations. Examples of dispersants include, but are not limited to, Busperse 2139, and Busperse 46.

The present invention, as indicated above, further relates to a system or device to remove scale build-up. The system includes a vessel having at least one screen and a cover located at least inside the vessel and beneath the screen having the scale build-up. The cover located inside the vessel separates the screen from the rest of the vessel and defines an upper portion and a lower portion of the vessel. The cover is preferably located in close proximity to the screen. The system further includes the presence of a boil-out chemical formulation located in the upper portion of the vessel which preferably submerges the screen having the scale build-up. The system can optionally have a recirculation system to recirculate the boil-out chemical formulation located in the upper portion of the vessel.

Figure 2B:
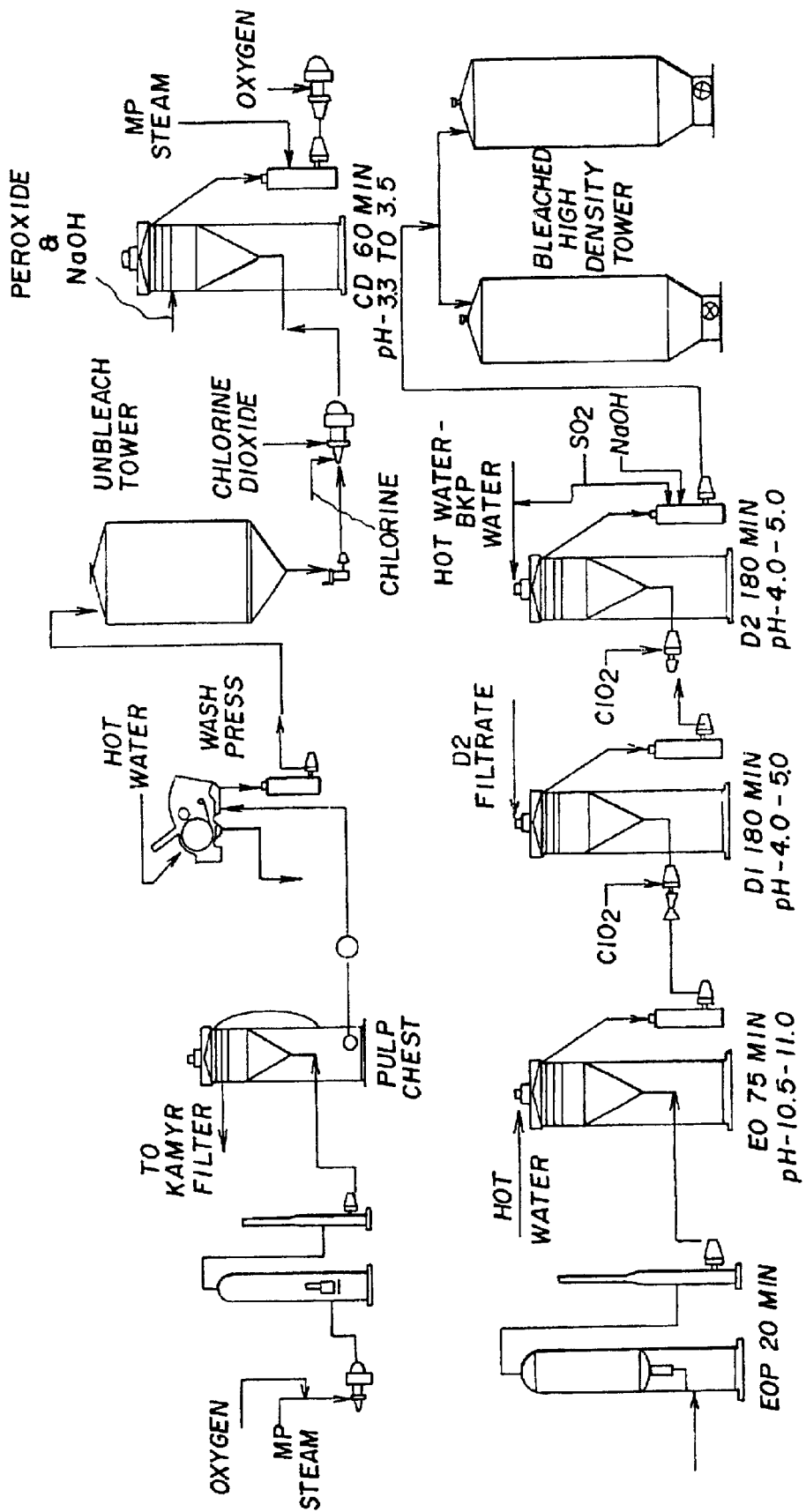

As shown in FIG. 1, an example of one embodiment of the present invention involves a vessel used in the pulp and paper industry. As shown in FIG. 1, 11 represents an exemplary circular screen that is located in the upper portion of the vessel. 13 shows the vessel itself and the upper portion of the vessel. 15 shows the preferred height or the distance between the cover 19 and the height of the boil-out chemical formulation to submerge screen 11. 17 refers to the lower portion of the vessel wherein a material, such as pulp 29, is located beneath cover 19 in order to provide preferred structural support to cover 19. 21 refers to the preferred optional recirculation system wherein boil-out formulation is pumped out of the lower portion of the screen through the recirculation lines 21 and back into the upper portion of the vessel Through lines 27. 25 represents a heat exchanger which preferably heats the boil-out chemical formulation prior to reintroduction into the vessel. 23 represents a recirculation pump which is preferably present in order to pump the boil-out formulation out of the vessel for recirculation purposes. 31 represents the lid or top of the vessel. FIGS. 2A and 2B represent schematic diagrams of a preferred pulp operation used to bleach pulp wherein the preferred vessels identified as D1 and D2 can benefit from the processes and systems of the present invention. Also EO which represents (Extraction+Oxygen) can benefit from the systems of the present invention as well as CD which represents (Chlorine+Chlorine Dioxide). Also, in this system, the following components of the pulp manufacturing system can benefit from the methods and systems of the present invention: all extraction screen areas (such as the digester extraction screens), brown stock washers, pulp washer cyclones, and the like.

The present invention will be further clarified by the following examples, which are intended to be purely exemplary of the present invention.

EXAMPLES

At a pulp mill, the systems and methods of the present invention were used in an experiment in order to determine whether scale build-up in a $D_1$ stage diffuser liquid extraction screen could be removed. In this experiment, the unit was taken off line and bypassed. The $D_1$ diffuser was opened in order to prepare the diffuser for the introduction of the chemical boil-out formulation which was a combination of Busperse 2043 and Busperse 2139, both available commercially from Buckman Laboratories International, Inc. Prior to introduction of the chemical boil-out formulation, visual and physical inspection of the extraction screen in the diffuser was done and significant scale build-up was present on the screen. Chemical analysis of the scale build-up showed that the primary scale build-up was a result of calcium oxide deposits. In this experiment, a thermal resistant fabric having dimensions of from about 20 feet to about 25 feet in diameter was placed inside the vessel and beneath the extraction screen as a shown in FIG. 1. Prior to laying out the thermal resistant fabric or cover, the pulp in the diffuser was lowered to a level just beneath the extraction screen as shown in FIG. 1. Then, the boil-out chemical formulation was introduced at an amount of 25,000 kg of Busperse 2043 and 5000 kg of Busperse 2139. The chemical formulation was introduced by an air pump. After the boil-out chemical formulation was introduced, a recirculation pump was switched on in order to recirculate the boil-out chemical formulation. The recirculation pump further permitted means to heat the boil-out chemical formulation as shown in FIG. 1 since a heat exchanger was part of the recirculation system. The temperature of the boil-out chemical formulation was gradually raised to about 95° C. within three or four hours wherein the recirculation rate of the boil-out solution was about 540 m$^3$/hr with the valve opened at about 50% and Differential Pressure at −230 mbar. At times, the recirculation rate was brought up to above 700 m$^3$/hr and periodic back flushing of the extraction flow was carried out once every one to two hours. Every four to five hours, a sample of the filtrate was taken for visual observation to determine the rate of de-scaling and it was observed that the scaling was occurring successfully. Since some boil-out solution was removed, at times, the addition of water was added to maintain the level of boil-out solution in the diffuser as shown in FIG. 1. After about 63 hours from when the recirculation pump was switched on, the boil-out was halted and the flow rate was noted to be about 550 m$^3$/hr with a valve opening of about 60% and a Differential Pressure at −110 mbar. The boil-out solution in the filtrate tank and D1 diffuser was opened and drained off completely and with flushing with fresh water, the D1 diffuser extraction screen was again inspected. Upon inspection, the D1 extraction screen revealed a clean metal surface having a quite shinny appearance where scaling was previously noted prior to the experiment. Closer observation of the extraction screen revealed some deposits of scale which were easily removed with medium pressure water. Through some general cleaning substantially all the remaining deposit was removed from the extraction screen.

In this experiment, the vessel volume was quite large at about 2,000 ton. With the present invention, the volume of the vessel receiving boil-out chemical formulation was reduced to less than 200 ton and with a high concentration of between 5 to 10% of Busperse 2043 with 1% Busperse 2139, the cost of removing the scale build-up by chemical means became quite viable and the shut-down time was dramatically minimized compared to the down time using mechanical means.

Other embodiments of the present invention will be apparent to those skilled in the art from consideration of the specification and practice of the invention disclosed herein as well as equivalents thereof. It is intended that the specification and examples be considered as exemplary only, with a true scope and spirit of the present invention being indicated by the following claims and equivalents thereof.

What is claimed is:

1. A method to remove scale build-up in a vessel having at least one screen comprising placing a cover inside said vessel and beneath said at least one screen to separate said screen from the rest of the vessel and to form an upper portion and a lower portion in said vessel, and wherein said cover is in close proximity to said screen located in said upper portion; and introducing a chemical formulation into said upper portion in a sufficient amount to remove at least a portion of the scale bulid-up on said screen.

2. The method of claim 1, wherein said chemical formulation is added in a sufficient amount such that at least one screen is submerged in said chemical formulation.

3. The method of claim 1, further comprising means to recirculate said chemical formulation in said upper portion of said vessel.

4. The method of claim 1, comprising heating means to heat said chemical formulation.

5. The method of claim 1, wherein said cover is a fluid tight cover which prevents said chemical formulation from entering said lower portion of said vessel.

6. The method of claim 1, wherein said vessel contains a material in said lower portion of said vessel to support said cover.

7. The method of claim 1, wherein said vessel is a diffuser, digester or hydrocyclone.

8. The method of claim 1, wherein said vessel is located in a paper or pulp manufacturing plant.

9. The method of claim 1, wherein said chemical formulation is present for a sufficient time to remove at least a portion of the scale build-up on said screen.

10. The method of claim 1, wherein said chemical formulation is present in a sufficient amount and for a sufficient time and at a sufficient temperature to remove at least a portion of the scale build-up on said screen.

11. The method of claim 1, wherein said chemical formulation comprises at least one scale removing chemical and optionally at least one dispersant.

12. The method of claim 1, wherein said chemical formulation comprises a chelant.

13. The method of claim 1, wherein said chemical formulation comprises an acid.

14. The method of claim 1, wherein said chemical formulation comprises an alkali.

15. The method of claim 1, further comprising removing said chemical formulation after said chemical formulation has been present for a sufficient time to remove at least a portion of said scale build-up and then flushing the upper portion of the vessel with an aqueous solution to remove any residual chemical formulation and then removing said cover.

16. The method of claim 1, wherein said chemical formulation has a temperature of from about 55° C. to about 95° C.

17. The method of claim 1, wherein said chemical formulation is in contact with said screen for a period of from about 24 hours or less to about 48 hours or more.

18. The method of claim 1, wherein said chemical formulation is in contact with said screen for a time of from about 36 hours to about 48 hours.

19. The method of claim 1, wherein said screen is a metal or plastic material.

20. The method of claim 1, wherein said vessel has a capacity of from about 1,000 tons to about 10,000 tons.

21. The method of claim 1, wherein said vessel has a capacity of from about 2,000 tons to about 2,500 tons.

22. The method of claim 1, wherein said chemical formulation is added in an amount of from about 20,000 kg in a vessel having a capacity of from about 2,000 tons to about 2,500 tons.

23. The method of claim 1, wherein said chemical formulation is introduced in an amount of from about 2,000 kg in a vessel having a capacity of from about 2,000 tons to about 2,500 tons.

* * * * *